United States Patent [19]
Hirsch

[11] Patent Number: 6,004,214
[45] Date of Patent: Dec. 21, 1999

[54] METHOD OF FORMING A DEVICE HAVING A CAPTURED WASHER

[75] Inventor: Anton J. Hirsch, Franklin Park, Ill.

[73] Assignee: Cobra Metal Works Corp., Franklin Park, Ill.

[21] Appl. No.: 09/136,973

[22] Filed: Aug. 20, 1998

[51] Int. Cl.⁶ .................................................. B21D 53/20
[52] U.S. Cl. .................................. 470/41; 470/3; 470/8; 470/11; 29/413; 82/47
[58] Field of Search .................................. 470/2, 3, 8, 11, 470/41, 42; 82/1.11, 47; 29/412, 413, 416

[56] References Cited

U.S. PATENT DOCUMENTS

| | | |
|---|---|---|
| 3,967,875 | 7/1976 | Stanaitis . |
| 4,123,132 | 10/1978 | Hardy et al. . |
| 4,157,725 | 6/1979 | Stanaitis . |
| 4,654,913 | 4/1987 | Grube . |
| 4,963,063 | 10/1990 | Gulistan . |
| 4,975,007 | 12/1990 | Molina . |
| 5,123,792 | 6/1992 | Strobel . |
| 5,308,285 | 5/1994 | Malen et al. . |
| 5,489,177 | 2/1996 | Schmidt, Jr. . |

*Primary Examiner*—Lowell A. Larson
*Assistant Examiner*—Ed Tolan

[57] ABSTRACT

A method of forming an apparatus having a captured washer includes the step of forming a shaft with a first end, a second end, a shaft diameter, and an axis. A stop element is provided on the shaft. An integral washer is formed on the shaft spaced from the stop element. The washer has a thickness and a diameter greater than the shaft diameter. The washer extends generally perpendicular to and radially outward from the shaft. The washer has a first surface facing the stop element and opposite surface facing opposite the first surface. A button is formed on and extends axially from the washer opposite. The button has a diameter greater than the shaft diameter and less than the washer diameter. A groove is formed into the first surface of the washer and defines a washer opening having an inside diameter less than the button diameter. The groove is formed so that the washer remains attached to the button by a material bridge extending between the button and. The washer is then separated from the button at the material bridge and retained on the shaft of the apparatus by the diameter difference between the button diameter and the diameter of the washer opening and by the stop element.

18 Claims, 1 Drawing Sheet

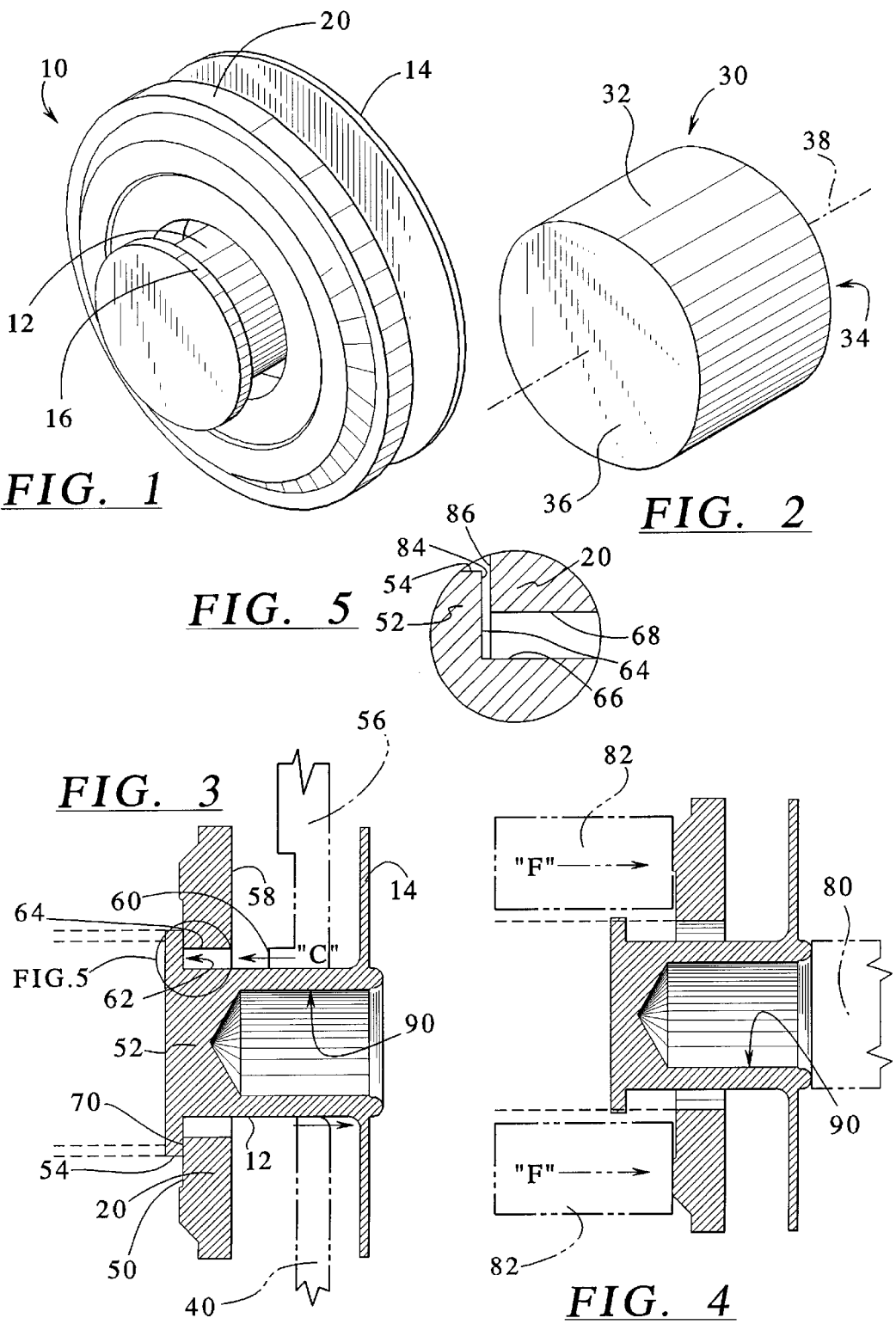

METHOD OF FORMING A DEVICE HAVING A CAPTURED WASHER

BACKGROUND OF THE INVENTION

This invention relates generally to fasteners and other devices utilizing washers, and more particularly to such a device having a captured washer thereon and a method of producing such a device.

It is known to produce devices such as fasteners which include a washer captured on the device so that it may not be easily removed. One example of such a device includes a captive nut and washer assembly disclosed in U.S. Pat. No. 4,654,913 issued to Grube. A method of forming this device includes forming the nut and washer as a single blank. A frusto-conical groove is formed at an oblique angle to the axis of symmetry defining a separation between the nut and washer. An axial compression force is applied separating the washer from the nut along a frusto-conical fracture defined between the bottom of the groove and a concave or angled inner diameter of the washer. The orientation of the fractured surface causes the washer to be captured on the nut.

Another example is disclosed in U.S. Pat. No. 4,157,725 issued to Stanaitis. This type of fastener includes a hex head and an elongate shaft having a smooth outer surface. A washer is preassembled onto the smooth shaft after which threads are roll formed into the smooth surface. The formation of the threads increases the diameter of the shaft to the major diameter of the threads to capture the washer on the fastener.

A further example is disclosed in U.S. Pat. No. 5,308,285 issued to Malen. In this type of fastener, the shaft of the fastener includes a raised portion having an outer diameter which is slightly greater than an inside diameter of an opening of a washer. The washer is forced over the raised portion wherein it elastically deforms. Once the washer passes over the raised portion, its inside diameter returns to a diameter slightly smaller than the raised portion to capture the washer on the shaft of the fastener.

One problem with the fastener of the Grube reference is that the fractured surface is formed on an angle. In order to prevent the washer from being removed from the nut over the frusto-conical surface of the fracture, the length of the fracture must be significantly large. If this is not so, the washer may be forced over the frusto-conical surface with relative ease. The large or longer the surface fracture, the more difficult it will be to break the washer from the nut which also may result in an improper fracture.

One problem with the Stanaitis fastener is that it requires additional steps in forming the fastener. The washer and the bolt are formed separately and then assembled to one another prior to the additional steps of forming the threads on the fastener. Additionally, the washer of this type of fastener may sometimes be removed from the fastener simply by rotating it in order to utilize the threads to drive the washer toward the free end of the fastener. One other problem with this type of fastener is that again, the difference in the inside diameter of the washer opening and the outside diameter of the threads is relatively small which may permit the washer to be forced from the fastener over the threads.

One problem with the Malen et al. fastener is that since the washer is elastically forced over the raised bump in order to place the washer on the fastener, it may be forced back over the raised bump and removed from the fastener at least as easily. Additionally, with this type of fastener the washer and the fastener are formed separately as with the Stanaitis type fastener.

SUMMARY OF THE INVENTION

The present invention is directed to a method of forming a device such as a fastener having a washer captured thereon which solves many of the problems described above. The method of the invention provides a device wherein the washer and the remaining portion of the device are formed as a single unit. The washer is then broken apart from the rest of the device using an axial compression force and remains captured on the device. The method of the invention produces such a captured washer wherein the abutting surfaces of the washer and the portion of the device where the washer was broken from are generally at right angles or 90° relative to the direction by which the washer would be removed from the device. There are no angled surfaces to assist in forcing the washer over a portion of the device. Additionally, utilizing the method of the invention permits producing a washer having a inside diameter of an opening which is significantly smaller than the portion of the device from which it is removed thus assuring that the washer will remain captured on the device.

In one embodiment, a method of forming an apparatus having a captured washer thereon includes first forming an apparatus shaft having a first end, a second end, a shaft diameter, and an axis. A stop element is provided on the shaft. An integral washer is formed as a part of the shaft spaced from the stop element. The washer has a washer thickness and a washer diameter greater than the shaft diameter. The washer is formed so that it extends generally perpendicular to and radially outward from the shaft and has a first surface facing the stop element and a second surface opposite the first. A button is formed on the second surface and extends axially therefrom. The button has a button diameter which is greater than the shaft diameter and less than the washer diameter. A groove is then formed into the first surface of the washer and defines a washer opening having an inside diameter less than the button diameter. The groove is formed so that the washer remains attached to the button by a material bridge extending between the second surface of the washer and the button. The button is then separated from the washer at the material bridge. Utilizing this method of the invention, the washer is retained on the apparatus by the diameter of the button.

In one embodiment of the invention, the method includes the step of forming a cylindrical fastener shaft.

In one embodiment, the method includes the step of cutting the groove into the first surface of the washer in a direction parallel to the axis of the fastener.

In one embodiment, the method includes the step of breaking the material bridge by application of an axial force applied to the second surface of the washer.

In one embodiment, a method of forming an apparatus having a captured washer thereon includes first providing a solid circular cylinder of material which has a first end, a second end, a cylinder diameter, and an axis. A portion of the material is removed between the first and second ends to form an apparatus having a flange at the first end and an integral washer at the second end. The material is removed between the flange and the washer to form a shaft extending between the two. The material is removed in such a manner so that the flange and washer retain the cylinder diameter while the shaft has a shaft diameter less than the cylinder diameter. The next step of the method includes forming a button on the washer extending outward from the washer toward the second end of the cylinder. The button is formed having a diameter less than the cylinder diameter but greater than the shaft diameter. The next step includes extending a cutting tool toward and directly adjacent the shaft between the flange and the washer and then rotating the apparatus about the axis. The next step includes moving the tool toward the washer along the shaft to cut a groove into the washer. The groove is cut to a depth generally coplanar with a plane defined by a surface of the washer on which the button is formed. The groove is formed having an outside diameter less than the button diameter so that the washer remains attached to the button by a material bridge extending between the washer and the button. The rotation of the apparatus is then terminated. A force is applied to the washer axially relative to the apparatus to break the material bridge and separate the washer from the button. Fragments of material left on the washer and the button where the material bridge was broken is then removed to complete the formation of the apparatus.

Thus, formation of a device having a captured washer may be produced from an initial solid slug of material machined to form a device with an integral washer. Alternatively, a device such as a fastener may be initially formed utilizing other conventional processes such as casting, molding, forging or other known processes to produce an apparatus and an integral washer. A groove is then machined into the backside of the washer. The washer is then separated from the remaining portion of the apparatus by breaking a material bridge retaining the washer on the apparatus adjacent the groove. The material bridge may either be cut, fractured or otherwise broken in order to separate the washer from the remaining portion of the apparatus.

It is therefore an object of the present invention to provide a method of forming an apparatus having a captured washer. It is another object of the invention to provide such a method which permits using many alternative process to produce a starting or initial one-piece apparatus. It is another object of the present invention to produce an apparatus having a captured washer wherein the washer is securely retained on the apparatus thus making the washer very difficult to remove. It is a further object of the present invention to provide an apparatus with the captured washer which was initially formed as one-piece of material.

These and other objects, features and advantages of the present invention will become apparent upon review of the detailed description, appended claims and accompanying drawing figures.

BRIEF DESCRIPTION OF THE DRAWINGS

FIG. 1 illustrates a perspective view of one embodiment of an apparatus constructed in accordance with the present invention.

FIG. 2 illustrates a solid block of material from which the apparatus of FIG. 1 may be initially constructed.

FIG. 3 illustrates a cross sectional view taken along line III—III of the apparatus of FIG. 1 but taken before separation of the washer.

FIG. 4 illustrates a cross sectional view of the apparatus of FIG. 1 taken along line IV—IV and includes in phantom view one means to separate the washer from the remainder of the apparatus.

FIG. 5 illustrates an enlarged view of a portion of the apparatus shown in FIG. 3 taken from circle V.

DETAILED DESCRIPTION OF THE PRESENTLY PREFERRED EMBODIMENTS

Turning now to the drawings, FIG. 1 illustrates an apparatus 10 constructed in accordance with one embodiment of the present invention. The apparatus 10 is one form of a device or fastener to which the present inventive method is directed. In the present embodiment, the apparatus 10 includes a shaft 12, a stop element or flange 14 disposed at one end, and a button 16 disposed at the opposite end of the shaft. Captured on the shaft 12 between the button 16 and the flange 14 is a floating washer 20.

The button 16 may be in the form of a hex head of a fastener and the shaft 12 may be in the form of a threaded fastener shaft. The stop element 14 may be in the form of a formed shoulder on the shaft of the fastener spaced from the fastener head or may be in the form of the threads carried on the shaft. As will be evident to those skilled in the art, the method of the invention is applicable to many fasteners or other devices without departing from the scope of the invention.

FIG. 2 illustrates a solid circular cylinder 30 of a material such as steel having an outer surface 32 defining a cylinder diameter. The cylinder 30 has a first end 34, a second end 36, and a central axis 38. In this embodiment, the cylinder 30 may be machined, milled, turned or otherwise worked to remove much of the material in order to produce the near final product or apparatus 10. FIG. 3 illustrates the apparatus 10 prior to separating the washer 20 from the button 16 as is described below in more detail.

To produce the apparatus 10 from the cylinder 30, the cylinder is first placed on a device such a lathe (not shown) and rotated or turned. A first tool 40, illustrated in FIG. 3 in phantom view, is utilized to remove much of the material from the cylinder 30 in the area between the flange 14 and the washer 30. The tool 40 is used to cut away the material until the shaft 12 achieves a predetermined diameter.

The contour of the washer 20 is next formed utilizing a tool similar to tool 40, though not shown, to remove material in order to produce a desired contour on an outer surface 50 of the washer 20. In the present embodiment, as the outer surface 50 is formed, a button 52 or circular cylinder is formed extending from the outer surface 50 of the washer 20. The button 52 extends a predetermined height beyond the outer surface 50 so that the button includes a predetermined button diameter defined by the outer circumferential surface 54. A raised step 55 is illustrated in FIG. 3 on the outer surface 50. This raised step is utilized for applying a load to the washer 20 as described below.

The next step in forming the apparatus of the invention requires a novel undercut tool 56 illustrated in phantom view in FIG. 3. This tool 56 is advanced radially toward the shaft 12 until the distal end of the tool is adjacent the shaft. The tool 56 is then advanced in the direction of arrow "C" toward an inner surface 58 of the washer 20. The tool 56 includes a cutting edge 60 at its distal end. The cutting edge 60 is used to cut a groove 62 into the washer 20 as the apparatus 10 is rotated. The groove 62 has a depth defined by a bottom surface 64 and has an inside surface 66 which in the present invention follows the contour of shaft 12 and an outer surface 68 which defines the washer opening. The diameter of the washer opening or washer diameter defined by the outside surface 68 of the groove 62 is less than the button diameter defined by the button circumferential surface 54 for reasons described below.

The washer 20 remains attached to the button 52 by a material bridge 70 extending around the button. The characteristics of the material bridge 70 are determined by the difference between the button diameter or circumferential surface 54 and the smaller inside washer diameter determined by the groove outer surface 68. The material bridge is also defined by the planar relationship of the outside washer surface 50 adjacent the button and the bottom surface 64 of the groove 62. In the present preferred embodiment, a plane defined by the bottom surface 64 and a plane defined by the washer outside surface 50 are generally co-planar. This eliminates forming an angled or chamfered surface when the washer 20 is separated from the button 52 as is described below. In a preferred embodiment of the invention, the fracture between the washer 20 and button 52 occurs along a plane defined by the outside surface 50 of the washer which is generally perpendicular to the central axis 38.

The washer 20 is then separated from the button 52 of the apparatus 10 as is illustrated, for example, in FIG. 4. The apparatus 10 is supported by a fixed support 80 at one end adjacent the stop element or flange 14. An annular tool 82 is then utilized to apply a compression force in the direction of the arrow "F" against the washer 20 on its outside surface 50. This force "F" must be sufficient to break the material bridge 70. Utilizing the presently described process of the invention leaves a fractured surface 84 and 86 on both the button 52 and washer 20, respectively. These surfaces are best illustrated in FIG. 5. These fractured surfaces 84 and 86 are initially rough and may be finished in order to remove irregularities utilizing any known means. As is illustrated in FIG. 5, the inside diameter of the washer defined the surface 68 and the outside diameter of the button defined by the surface 54 provide the interference so that the washer 20 may not be removed over the button 52.

As will be evident to those skilled in the art, the washer 20 may be separated from the apparatus 10 utilizing other known means. For example, a cutting tool may be radially advanced along the washer outer surface 50 into the outer circumferential surface 54 of the button 52 in order to separate the two components. Additionally, the invention is not to be limited to the process of machining or milling a metallic cylinder 30 of material. An apparatus or object may be formed by other processes including casting, molding, or other known means in order to form an object having a shaft and an integrally formed washer. The stop element 14 and the button 52 may also easily be formed via molding or casting into the beginning apparatus. The apparatus may be in the form of a fastener wherein the button is a hex head and the shaft is a threaded shaft extending from the hex head wherein the washer is integrally formed as a part of the shaft and the head of the fastener. The threads of the fastener may comprise the stop element in order to keep the washer from being removed from the fastener. Alternatively, a separate shoulder may be formed during the initial forging, casting or molding process of the fastener spaced from the head and the washer to form the stop element.

FIGS. 3 and 4 illustrate an apparatus 10 which is intended for use as a part of an air bag of an automobile. The apparatus 10 includes a blind bore 90 formed parallel with the central axis 38 within the shaft 12. This blind bore 90 is intended for being received over a part of the air bag mechanism, although such a mechanism is not shown within the present drawing figures. As will be evident to those in the art, this blind bore 90 need not be incorporated into an apparatus having a captured washer produced by the method of the invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A method of forming an apparatus having a captured washer thereon; the method comprising the steps of:
   (a) forming a shaft having a first end and a second end and a shaft diameter and an axis;
   (b) providing a stop element on the shaft;
   (c) forming a washer as an integral part of the shaft spaced from the stop element, the washer extending radially outward from the shaft and having a first surface facing the stop element and a second surface opposite the first surface;
   (d) forming a button on and extending axially from the second surface, the button having a button diameter greater than the shaft diameter;
   (e) forming a groove into the first surface of the washer whereby the groove defines a washer opening having an opening diameter less than the button diameter, the groove being formed so that the washer remains attached to the button by a material bridge between the washer and the button; and
   (f) separating the washer from the button at the material bridge by an axial force against the second surface and towards the stop element.

2. The method according to claim 1, wherein the step of forming a shaft further comprises:
   forming a circular cylindrical shaft of a metal material.

3. The method according to claim 1, wherein the step of providing a stop element further comprises:
   providing a stop element adjacent the first end of the shaft.

4. The method according to claim 1, wherein the step of providing a stop element further comprises:
   providing an annular flange extending radially outward from the first end of the shaft and having a flange diameter greater than the washer opening diameter.

5. The method according to claim 1, wherein the step of providing a stop element further comprises:
   providing a raised section extending radially outward from the first end of the shaft and having a diameter greater than the washer opening diameter.

6. The method according to claim 1, wherein the step of providing a stop element further comprises:
   providing a plurality of threads on the shaft, the threads having a major diameter greater than the washer opening diameter.

7. The method according to claim 1, wherein the step of forming a washer further comprises:
   forming a washer extending generally perpendicular to the axis of the shaft, the washer having a washer diameter greater than the button diameter.

8. The method according to claim 1, wherein the step of forming a washer further comprises:
   forming a raised annular surface extending from the second surface of the washer.

9. The method according to claim 8, wherein the step of separating the washer from the button further comprises:
   applying a force against the raised annular surface of the washer in a direction parallel to the axis of the shaft, the force of sufficient magnitude to break the material bridge.

10. The method according to claim 1, wherein the step of separating the washer from the button further comprises:
    applying a force against the raised annular surface of the washer in a direction parallel to the axis of the shaft, the force of sufficient magnitude to break the material bridge.

11. The method according to claim 1, wherein the step of forming a button further comprises:

forming the button as a hex head extending from the second surface of the washer.

12. The method according to claim 1, wherein the step of forming a button further comprises:

forming the button as a circular cylinder extending from the second surface of the washer.

13. The method according to claim 1, where in the step of forming a groove further comprises:

cutting the groove into the first surface of the washer to a depth generally corresponding to a plane defined by the second surface of the washer.

14. The method according to claim 1, further comprising the steps of:

providing a solid circular cylinder of material having a longitudinal axis;

turning the cylinder about the longitudinal axis: and forming the shaft, stop element, washer, button and groove by removing material from the cylinder.

15. A method of forming an elongate cylindrical fastener element from a metal and having a washer captured thereon, the method comprising the steps of:

(a) forming a cylindrical fastener shaft having a first end and a second end and a shaft diameter and an axis;

(b) providing a stop element on the shaft;

(c) forming an integral washer on the shaft spaced from the stop element and positioned between the stop element and the second end, the washer having a washer diameter greater than the shaft diameter and having a first surface facing the stop element and a second surface opposite the first surface;

(d) forming a head on and extending axially from the second surface, the head having a head diameter greater than the shaft diameter and less than the washer diameter;

(e) cutting a groove into the first surface whereby the groove defines a washer opening having an opening diameter less than the head diameter, the groove being cut to a depth so that the washer remains attached to the head by a material bridge between the second surface of the washer and the head; and (f) breaking the material bridge to separate the washer from the head.

16. A method of forming an apparatus having a captured washer thereon, the method comprising the steps of:

(a) providing a solid circular cylinder of material having a first end and a second end and a cylinder diameter and an axis;

(b) removing a portion of the material between the first and second ends to form an apparatus having a flange at the first end having a flange diameter, a washer at the second end having a washer diameter, and a shaft extending between the flange and the washer having a shaft diameter less than the cylinder diameter and greater than the washer diameter and the flange diameter;

(c) removing a portion of material from the cylinder to form a button on the washer extending outward from the washer toward the second end of the cylinder, the button having a button diameter less than the washer diameter and greater than the shaft diameter;

(d) extending a cutting tool toward and directly adjacent the shaft between the flange and the washer;

(e) rotating the apparatus about the cylinder axis;

(f) moving the cutting tool toward the washer along the shaft;

(g) cutting a groove into the washer to a depth generally co-planar with a plane defined by an outer face of the washer on which the button is formed and having an outside groove diameter less than the button diameter so that the washer remains attached to the button by a material bridge;

(h) terminating rotation of the apparatus; and (i) applying an axial force to the outer face of the washer to break the material bridge and separate the washer from the button.

17. The method according to claim 16, further comprising the step of:

rotating the cylinder during steps (b) and (c) about the cylinder axis; and advancing a cutting tool toward the cylinder to remove material from the cylinder.

18. The method of claim 16, further comprising the steps of:

forming a raised annular surface on the outer surface of the washer; and applying the axial force against the raised annular surface.

* * * * *